United States Patent Office 3,033,606
Patented May 8, 1962

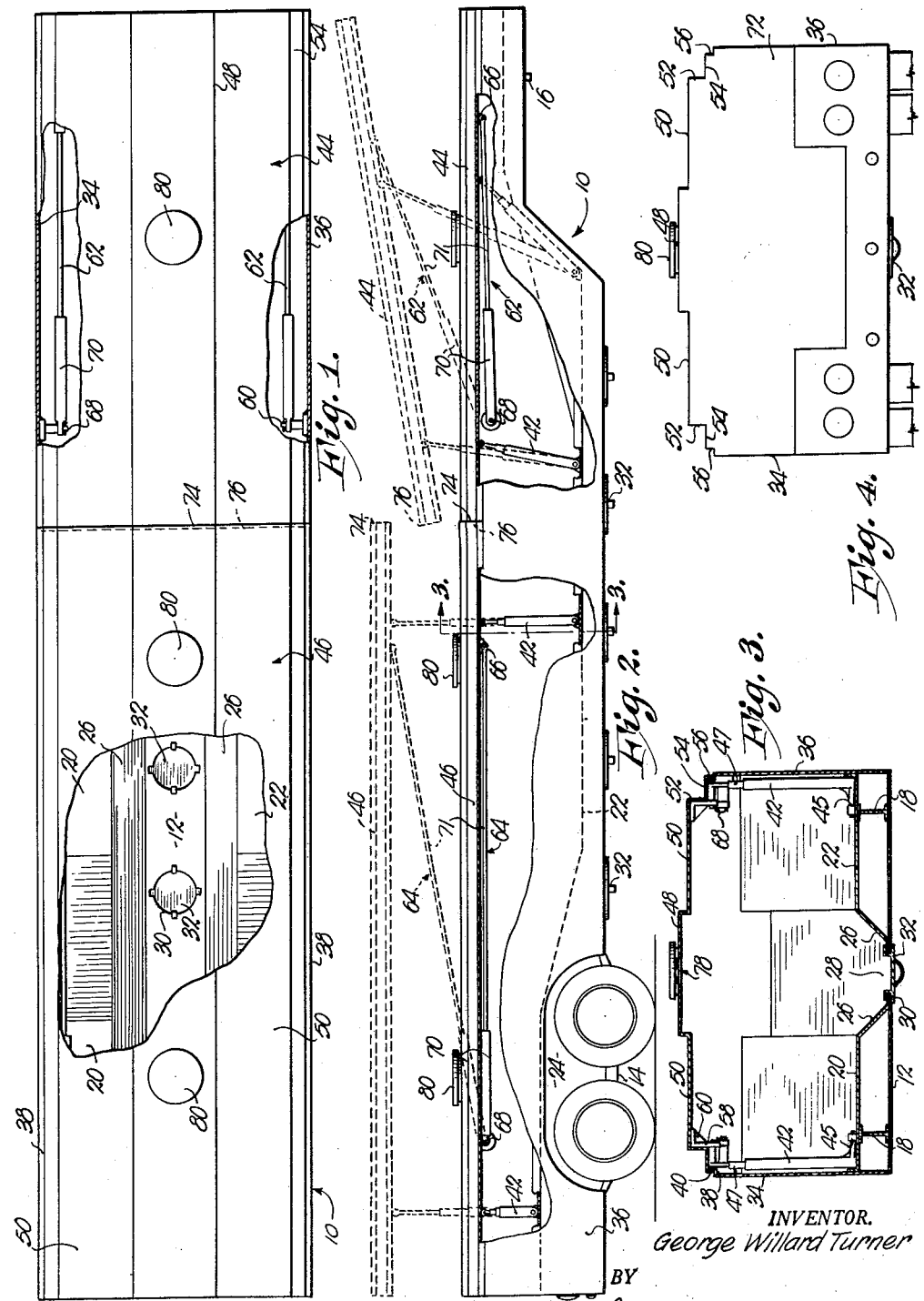

3,033,606
TRANSPORT TRAILER
George Willard Turner, North Kansas City, Mo., assignor to Backhaul, Inc., Kansas City, Mo., a corporation of Missouri
Filed Dec. 14, 1959, Ser. No. 859,306
4 Claims. (Cl. 296—1)

This invention relates to transport trailers and more particularly to a trailer adapted to haul either vehicles or general cargo, such as grain.

It is well known that due to the peculiar and particular construction of trailers adapted for transporting vehicles it is generally necessary that, after such trailers have been utilized to transport a shipment of vehicles to their destination, it is necessary that they be returned to their point of origin in an empty condition. This results in much loss of time and money to owners and operators of such transport trailers and it is to primary object of this invention to provide a transport trailer which may be utilized to carry vehicles to their point of delivery and which can carry grain or the like on the return trip.

To this end it is a primary object of this invention to provide a transport trailer having a pair of vertically movable platforms which platforms serve to support vehicles carried by the trailer during one portion of its round trip and function as a roof to enclose the trailer and create a substantially enclosed van for the carrying of general cargo on the return trip.

A yet further aim of the present invention is to provide a transport trailer having a bottom wall, a lower track assembly spaced from the bottom wall and carried thereby, a pair of upper platforms spaced from the bottom wall and the track assembly and a plurality of hydraulic jacks interposed between the track assembly and the upper platforms to allow vertical movement of the platforms.

A yet further aim of the instant invention is to provide locking arms for said platforms when the same are in an elevated condition, the locking arms being pivotally coupled with the platforms and with the upstanding side walls of the trailer.

Other objects include details of construction such as the way in which the elevatable platforms overlie the side walls when in a lowered condition, the manner in which the end of one platform overlies the adjacent end of the other platform and many other details of construction which will become apparent from the following specification and accompanying drawing wherein:

FIG. 1 is a top plan view of the transport trailer, parts being broken away to reveal details of construction;

FIG. 2 is a side elevational view thereof showing the platforms in both a lowered and raised position, parts thereof being broken away for clarity;

FIG. 3 is a sectional view taken along line 3—3 of FIG. 2; and,

FIG. 4 is a rear elevational view of the transport trailer.

The transport trailer, broadly designated by the numeral 10 includes a bottom wall 12 supported in a conventional manner by a tandem axle assembly 14 and pin 16 received by a conventional fifth wheel assembly in order that the trailer 10 may be towed by a tractor (not shown). A pair of longitudinal I-beams 18 are supported by bottom wall 12 and in turn support a pair of track means 20 and 22. Track means 20 and 22 are spaced from bottom wall 12 and extend the length of trailer 10 as best seen in FIG. 2. As shown therein, track means 22 are raised over wheel well 24 and then inclined forwardly and downwardly to lie in a substantially horizontal plane throughout the center portion of trailer 10 and then are inclined upwardly at the forwardmost end of trailer 10 to accommodate the recess provided for the towing tractor. Track means 20 and 22 are identical in configuration throughout their lengths and are designed to support automobiles carried on the lower deck of trailer 10.

As seen in FIG. 3, the innermost longitudinal edge portions 26 of tracks 20 and 22 are inclined downwardly toward bottom wall 12 and join therewith whereby to provide a channel 28 between the tracks 20 and 22, said channel 28 extending the length of trailer 10 between track means 20 and 22, bottom wall 12 forming the bottom of channel 28. Provided in that portion of bottom wall 12 forming the bottom of channel 28 are a plurality of outlet openings 30 provided with a suitable closure such as 32 whereby the contents of the trailer may be removed through the bottom thereof between the tracks 20 and 22.

A pair of upstanding side walls 34 and 36 run the length of trailer 10 and are suitably secured to the bottom wall 12 as well as track means 20 and 22 at the outermost longitudinal edges thereof. As shown in FIG. 3, the uppermost portions of side walls 34 and 36 are provided with an L-shaped bend whereby to present a horizontal leg 38 substantially parallel with track means 20 and 22 and bottom wall 12 and a vertical leg 40 spaced from its corresponding side wall and lying in a plane substantially parallel thereto for purposes hereinafter explained.

Carried by track means 20 and 22 are a plurality of hydraulic jacks 42, it being preferred that track means 22 should support four of said jacks and track means 20 should also support four of said jacks in opposed relation to those supported by track means 22, the jacks 42 being disposed in spaced relation along the outermost marginal edges of their respective supporting tracks 20 and 22. Jacks 42 have their lowermost base ends pivotally secured to the corresponding supporting track means 20 and 22 by means of suitable brackets such as 45.

Carried by the uppermost ends of the jacks 42 are a first upper platform 44 supported by the forwardmost four of the jacks 42 and a second upper platform 46 supported by the rearmost four of jacks 42. Platforms 44 and 46 are identical in transverse configuration and as best shown in FIGS. 3 and 4 have a central raised portion 48 and a pair of spaced ramp portions 50, the platforms 44 and 46 being bent downwardly at the outermost edges of said ramp portions 50 as at 52, outwardly as at 54 and downwardly again to present a pair of downwardly facing outermost flanges 56, said flanges 56 extending the full length of each of said platforms 44 and 46.

The uppermost ends of jacks 42 are pivotally coupled with their respective platforms 44 and 46 by means of brackets 58 which brackets include a reinforcing gusset 60. Thus jacks 42 are pivotally mounted at their lowermost base ends on track means 20 and 22 and are also pivotally coupled at their uppermost ends with corresponding platforms 44 and 46, it being preferred that four suitably spaced jacks 42 shall be used to elevate each of said platforms 44 and 46. Jacks 42 are conventional in nature and are operated by a suitable source of hydraulic fluid, not shown. The rearmost of jacks 42, as best seen in FIG. 2 are preferably multistep jacks inasmuch as the spacing between platform 46 and track means 20 and 22 at the point of disposition of said rearmost jacks 42 will not allow a single step hydraulic jack. Pins, such as 47, may be used to lock jacks 42 in their extended position if such is desired.

A pair of locking arms 62 and 64 interconnect side walls 34 and 36 with platforms 44 and 46 respectively. Said locking arms 62 and 64 are pivotally coupled with platforms 44 and 46 by suitable brackets such as 66 and are also pivotally coupled with side walls 34 and 36 by means of connectors such as 68. Locking arms 62 and 64 are each comprised of a double acting piston and cylinder assembly 70 at one end thereof, the pistons of said assemblies having extensible stems 71, which stems 71 are pivotally coupled with the respective platforms 44 and 46 as hereinabove explained. Said piston and cylinder assembly 70 may be operated by the same source of hydraulic fluid as used to operate jacks 42, and by reason of being double acting can be utilized to lock stems 71 in their extended positions.

To create a substantially enclosed van type trailer, a suitable tailgate such as 72 may be placed within the rear opening of the trailer 10 when platforms 44 and 46 are in their lowered positions, it being noted that a seal is created along the upper edges of side walls 34 and 36 as a result of portions 54 and flanges 56 of platforms 44 and 46 overlying legs 38 and 40 of the upper edges of side walls 34 and 36. As is also apparent from FIGS. 1 and 2, platforms 44 and 46 are constructed and disposed in such a manner that, when lowered, the forwardmost transverse marginal edge 74 of platform 46 overlies the adjacent normally rearmost marginal portion 76 of platform 44 thus creating a weatherproof roof for the trailer. When the platforms are lowered and the tailgate is in position, access to the interior of the trailer 10 may be gained by means of inlet openings 78 provided in portions 48 of platforms 44 and 46 which inlet openings 78 are provided with suitable closures such as 80.

In use, it is contemplated that upper platforms 44 and 46 will be moved to their lowered position and vehicles driven thereonto along ramp portions 50 from a suitable loading dock or the like. In this respect it is to be noted that forward platform 44 is shorter in length than rear platform 46 and that vehicles of various sizes may be accommodated by the two platforms. After vehicles have been placed upon platforms 44 and 46 and suitably secured thereto, the platforms may be raised by means of jacks 42 and locked in place by arms 62 and 64. With platforms 44 and 46 so elevated additional vehicles may be placed in trailer 10 by driving the same thereinto along track means 20 and 22. When vehicles have been secured to the track means 20 and 22 and the trailer fully loaded, jacks 42 and piston and cylinder assemblies 70 may be actuated to suitably tilt platforms 44 and 46 to dispose the vehicles carried by trailer 10 in as compact a relationship as possible. Platforms 44 and 46 are then again locked in place by arms 62 and 64 which form the stems of piston and cylinder assemblies 70 and trailer 10 may be towed to its destination.

Upon reaching its destination and subsequent to the removal of the vehicles, platforms 44 and 46 are moved to their lowered positions whereby to create a roof for trailer 10 and convert the same into a substantially enclosed van type trailer. The rear opening is then closed by tailgate 72 and grain or similar general cargo may be placed within the trailer by means of inlet ports 78. It will thus be seen that the grain will completely fill the area between track means 20 and 22 and platforms 44 and 46 and that such cargo will be entirely protected from the elements during the transportation thereof by trailer 10. Upon reaching its return destination the contents of trailer 10 may be emptied through outlet openings 30 and trailer is then in condition for utilization again as a vehicle transporting trailer.

Having thus described the invention what is claimed as new and desired to be secured by Letters Patent is:

1. A wheeled transport trailer adapted for hauling either vehicles or freight and comprising a bottom wall; a pair of side walls; track means between said side walls and spaced from said bottom wall; a plurality of hydraulic jacks mounted on said track means; and first and second upper platforms pivotally carried by said jacks for vertical and tilting movement, said platforms having longitudinal marginal portions in overlying sealing relationship with said side walls and a transverse marginal portion of said second platform overlying said first platform when said platforms are in a lowered position whereby to form a roof for the trailer and create a substantially enclosed van.

2. A wheeled transport trailer adapted for hauling either freight or vehicles and comprising a bottom wall; a pair of side walls; track means between said side walls and spaced from said bottom wall; a pair of upper platforms spaced from said track means; a plurality of hydraulic jacks interconnecting said track means and said platforms, said jacks having their base ends pivotally secured to said track means and their opposite ends pivotally secured to corresponding platforms whereby said platforms may be selectively vertically adjusted; and a pair of arms interconnecting said side walls with each of said platforms, said arms being pivotally connected to said side walls and said platform; and locking means coupled with said arms whereby to hold the same in position to prevent longitudinal shifting movement of their respective platforms, said locking means constituting a piston and cylinder assembly operably coupled with said arms.

3. A wheeled transport trailer comprising a bottom wall; a pair of side walls; stationary track means between said side walls and spaced from said bottom wall; a plurality of hydraulic jacks pivotally mounted on said track means; a pair of upper platforms supported by said jacks and pivotally coupled thereto whereby to allow independent vertical and tilting movement of each of said platforms; arms interconnecting said side walls with each of said platforms; and a piston and cylinder assembly operably coupled with each of said arms whereby the latter and their corresponding platforms may be selectively locked in position.

4. A wheeled transport trailer comprising a bottom wall; a pair of side walls; stationary track means between said side walls and spaced from said bottom wall; a plurality of hydraulic jacks pivotally mounted on said track means; a pair of upper platforms supported by said jacks and pivotally coupled thereto whereby to allow independent vertical and tilting movement of each of said platforms; arms interconnecting said side walls with each of said platforms, said arms being pivotally coupled to said side walls and their corresponding platforms; and a piston and cylinder assembly operably coupled with each of said arms whereby the latter and their corresponding platforms may be selectively locked in position.

References Cited in the file of this patent

UNITED STATES PATENTS

| | | |
|---|---|---|
| 1,925,665 | Judd et al. | Sept. 5, 1933 |
| 2,461,927 | Schaldach et al. | Feb. 15, 1949 |
| 2,520,698 | Sniezyk | Aug. 29, 1950 |
| 2,551,239 | Bond | May 1, 1951 |
| 2,587,456 | Francis | Feb. 26, 1952 |
| 2,610,891 | Crockett | Sept. 16, 1952 |
| 2,611,640 | Francis | Sept. 23, 1952 |

FOREIGN PATENTS

| | | |
|---|---|---|
| 653,712 | Great Britain | May 23, 1951 |